(12) United States Patent
Van Den Bergen et al.

(10) Patent No.: US 11,708,493 B2
(45) Date of Patent: Jul. 25, 2023

(54) ADHESION PROMOTING COMPOUNDS FOR APOLAR SUBSTRATES

(71) Applicant: ALLNEX BELGIUM S.A., Drogenbos (BE)

(72) Inventors: Hugues Van Den Bergen, Drogenbos (BE); Paul Gevaert, Geraardsbergen (BE); Stephan Peeters, Heverlee (BE)

(73) Assignee: ALLNEX BELGIUM S.A., Drogenbos (BE)

( * ) Notice: Subject to any disclaimer, the term of this patent is extended or adjusted under 35 U.S.C. 154(b) by 443 days.

(21) Appl. No.: 16/765,538

(22) PCT Filed: Nov. 20, 2018

(86) PCT No.: PCT/EP2018/081951
§ 371 (c)(1),
(2) Date: May 20, 2020

(87) PCT Pub. No.: WO2019/101747
PCT Pub. Date: May 31, 2019

(65) Prior Publication Data
US 2020/0308417 A1    Oct. 1, 2020

(30) Foreign Application Priority Data

Nov. 21, 2017 (EP) ..................................... 17202773

(51) Int. Cl.
| | | |
|---|---|---|
| *C09D 4/00* | (2006.01) | |
| *C08F 222/10* | (2006.01) | |
| *B65D 65/42* | (2006.01) | |
| *C07F 7/00* | (2006.01) | |
| *C07F 7/28* | (2006.01) | |
| *C08F 230/04* | (2006.01) | |
| *C09D 11/101* | (2014.01) | |
| *C09D 11/107* | (2014.01) | |
| *C09D 135/02* | (2006.01) | |
| *C09D 143/00* | (2006.01) | |

(52) U.S. Cl.
CPC ............... *C09D 4/00* (2013.01); *B65D 65/42* (2013.01); *C07F 7/003* (2013.01); *C07F 7/28* (2013.01); *C08F 222/103* (2020.02); *C08F 230/04* (2013.01); *C09D 11/101* (2013.01); *C09D 11/107* (2013.01); *C09D 135/02* (2013.01); *C09D 143/00* (2013.01)

(58) Field of Classification Search
CPC ........ C07F 7/003; C07F 7/28; C08F 222/103; C08F 230/04; C08K 5/0091; C09D 4/00; C09D 7/65; C09D 11/101; C09D 11/107; C09D 135/02; C09D 143/00
See application file for complete search history.

(56) References Cited

U.S. PATENT DOCUMENTS

| | | |
|---|---|---|
| 4,536,468 A | 8/1985 | Yasui et al. |
| 5,859,087 A | 1/1999 | Zahora |
| 6,908,665 B2 * | 6/2005 | Rea ........................... B32B 7/12 |
| | | 428/308.8 |
| 7,083,831 B1 | 8/2006 | Koch et al. |
| 7,294,658 B2 * | 11/2007 | Rea ........................... B32B 7/12 |
| | | 522/182 |
| 7,619,021 B2 | 11/2009 | Duncan |
| 2003/0161976 A1 | 8/2003 | Rea et al. |
| 2012/0259065 A1 | 10/2012 | Sommer et al. |

FOREIGN PATENT DOCUMENTS

EP    0 606 971    7/1994

OTHER PUBLICATIONS

Asai et al. In situ synthesis of transparent TiO2 nanoparticle/polymer hybrid. J Mater Sci 48, 7503-7509 (2013) (Year: 2013).*
International Search Report (ISR) dated Jan. 23, 2019 in International (PCT) Application No. PCT/EP2018/081951.

* cited by examiner

Primary Examiner — Sanza L. McClendon
(74) Attorney, Agent, or Firm — Wenderoth, Lind & Ponack, L.L.P.

(57) ABSTRACT

Provided in the invention is an adhesion promoter (AP) that is the reaction product of: (i-1) at least one hydroxyl functional (meth)acrylated compound bearing at least two (meth)acryloyl groups, (i-2) optionally, at least one hydroxyl functional (meth)acrylated compound bearing one (meth)acryloyl group (ii), at least one titanium orthoester (ii-a) and/or at least one zirconium orthoester (ii-b), and, (iii) optionally, at least one other compound (iii) that is capable to react with hydroxyl groups. Materials of the invention are suitable for use in coating compositions, inks, paints, varnishes (including overprint varnishes), adhesives (including laminating adhesives), for the making of composites, molding compositions or 3D articles. Materials of the invention are suitable for use in inks and coating compositions (clear or pigmented).

19 Claims, No Drawings

ADHESION PROMOTING COMPOUNDS FOR APOLAR SUBSTRATES

The present invention relates to adhesion promoters, and to radiation curable compositions that improve the adhesion of a coating or a printing ink to a substrate to which the ink or coating is applied. The invention further relates to packaging materials or other types of substrates such as films that are coated or printed with materials of the invention. Materials of the invention in particular improve the adhesion of coatings and inks on non-porous substrates like polyolefins.

It is difficult to coat or to print a colored image onto e.g. a polyolefin molded article or polyolefin film, in particular polypropylene, and have the image retain sufficient adhesion to the surface of the polyolefin. The main problem is that polyolefins, in particular polypropylene, have few or no functional groups to which the coating or ink can typically bind.

To address this problem, it is known to treat the surface of the polyolefins to introduce functional groups thereon to which an ink or coating material can bind. Examples of such surface treatments include exposing a surface of the polyolefin to a corona discharge, ultraviolet radiation, heat, flame, or an electron beam, in the presence of air to oxidize the surface of the polyolefin.

Another way to address the problem of adhesion of the ink or coating to the surface of a polypropylene molded article or film is to modify the coating composition or the ink by adding adhesion promoters. Adhesion promoting compounds are e.g. used in commercial ink formulations in order to enhance the adhesion between the ink and the substrate onto which the ink is printed. Failure of adhesion leads to difficulties in the printing process or inadvertent removal of the print. Printing of plastics food packaging is widespread and it is particularly important in such applications that the printed ink remains on the packaging and that parts of the ink composition do not contaminate the product.

Adhesion promoters based on titanium or zirconium compounds are known and have been used commercially for many years.

U.S. Pat. No. 5,859,087 (DSM) describes radiation curable primer compositions containing a titanate or zirconate compound.

U.S. Pat. No. 7,294,658 also published as US 2003/0161976 discloses radiation curable adhesion compositions that contain from 0.1 to 20% of an organic titanate compound. The radiation curable adhesion composition comprises (a) at least 50 wt % of COOH-functional (meth)acrylate monomers that are the half ester of a hydroxy(meth)acrylate with an organic anhydride and (b) 0.1 to 20 w % of an organic titanate compound.

U.S. Pat. No. 7,619,021 describes adhesion promoters for printing inks that are obtained after mixing a solution of a polymer or synthetic resin with an organophosphorous compound, and then mixing the product thus obtained with a titanium compound that can be a titanium halide, alkoxide, halo-alkoxide, a condensed titanium alkoxide, or a mixture of more than one of these titanium compounds.

EP 0606971 describes an elastomer-forming silicone composition comprising (A) a vinyl-organopolysiloxane, (B) an organosilicon compound, (C) a noble metal catalyst and (D) an adhesion promoter which is the product of the mixture or reaction of (1) an organosiloxane compound having at least two trialkoxysilyl groups with (2) an unsaturated alcohol having at least one alpha, beta-unsaturated alkenyl group.

U.S. Pat. No. 4,536,468 describes a method of forming a resist pattern on a substrate by a lithographic technique using a resist ink containing a metal chelate resin and a polymerizable compound.

U.S. Pat. No. 7,083,831 describes a chromium-free corrosion inhibitor containing at least one titanium, silicon and/or zirconium compound corresponding to general formula (I): $[CR1R2CR3CO]_n MeOX_{4-n}$ in which Me is a titanium, silicon or zirconium ion, at least one other olefinically unsaturated comonomer containing at least two olefinically unsaturated double bonds per molecule, optionally other comonomers containing one olefinically unsaturated double bond per molecule, and at least one radical and/or cationic polymerization initiator that is activated by radiation.

Orthotitanate-derivatives containing saturated alkyl groups are not preferred in radiation curable compositions. After curing, they will release saturated alcohols upon hydrolysis and/or upon condensation with hydroxyl or carboxylic groups from the binder or substrate. This will lead to migrating species.

There is a need for radiation curable adhesion promoters which can be cured at high line speeds (up to 300 m/min f.i.), that do not contain a vehicle, such as water, that must be removed, that provides enhanced adhesion to non-porous substrates such as polyolefins, and that is compatible with conventional radiation curable inks. The materials of the invention may be used either as a primer composition on which conventional radiation curable inks can then be printed, or they may be added as adhesion promoters to radiation curable inks that exist on the market. They can further also be used in coating materials.

An advantage of materials of the invention is that they allow avoiding some unwanted side effects, such as an undesirable color change or an undesirable viscosity change in the inks, when they are added to the inks. Materials of the invention can be tailored to meet low migration specifications for inks.

Against this background we now provide an adhesion promoter (AP) that is the reaction product of:
- (i-1) at least one hydroxyl functional (meth)acrylated compound bearing at least two (meth)acryloyl groups,
- (ii) at least one titanium orthoester (ii-a) and/or at least one zirconium orthoester (ii-b), and,
- (iii) optionally, at least one other compound (iii) capable to react with hydroxyl groups.

In an embodiment of the invention, part of the compounds (i-1) may be replaced by compounds (i-2) that are selected from hydroxyl functional (meth)acrylated compounds bearing one (meth)acryloyl group.

Provided is hence also an adhesion promoter (AP) that is the reaction product of:
- (i-1) at least one hydroxyl functional (meth)acrylated compound bearing at least two (meth)acryloyl groups,
- (i-2) optionally, at least one hydroxyl functional (meth)acrylated compound bearing one (meth)acryloyl group
- (ii) at least one titanium orthoester (ii-a) and/or at least one zirconium orthoester (ii-b), and,
- (iii) optionally, at least one other compound (iii) that is capable to react with hydroxyl groups.

In a preferred embodiment of the invention no compounds (i-2) are used, only compounds (i-1).

By 'other' in the above embodiments is meant that the compound (iii) is different from compounds (i-1), if present compounds (i-2) and from compounds (ii). Compounds (iii) typically are selected from compounds that bear carboxylic acid groups.

Adhesion promoters (AP) as such obtained advantageously contain at least two (meth)acryloyl groups per molecule. By '(meth)acryolyl' is meant acryloyl, methacryloyl, mixtures of both as well as derivatives thereof. Preferably, the (meth)acryloyl group is a (meth)acrylate group.

Preferably compounds (i-1) have a hydroxyl value (IOH) that is from 10 to 300 mg KOH/g, preferably from 40 to 250 mg KOH/g, and more preferably from 100 to 200 mg KOH/g. Typically the acid value of compounds (i) is lower than 30 mg KOH/g, typically it is lower than 20 mg KOH/g and more typically lower than 10 mg KOH/g. Typically the hydroxyl value is higher than the acid value.

Preferably compounds (i) have an average hydroxyl functionality of about 1 (of 1). Acrylated compounds in general are preferred over methacrylated compounds if high reactivity is desired.

Herebelow is presented some information on preferred compounds (i-1).

Suitable compounds (i-1.a) are those selected from the group consisting of polyester (meth)acrylates, polyether (meth)acrylates, polyether ester (meth)acrylates, unsaturated polyesters having allyl ether structural units and polyepoxy (meth)acrylates having an OH number in the range from 15 to 300 mg KOH/g of substance—as described for instance in US 2012/259065. Preferred are in particular polyester (meth)acrylates, polyether (meth)acrylates, polyether ester (meth) acrylates and/or polyepoxy (meth) acrylates which contain hydroxyl groups in addition to the unsaturated groups.

Preferred herein are polyester (meth)acrylates with a hydroxyl number in the range from 15 to 300 mg KOH/g of substance, preferably from 60 to 200 mg KOH/g of substance. US 2012/259065 describes 7 groups of monomer constituents that can be used to make such polyester (meth) acrylates.

Equally suitable are the hydroxyl-group-containing epoxy (meth)acrylates with a hydroxyl number in the range from 20 to 300 mg KOH/g, preferably from 100 to 280 mg KOH/g, more preferably from 150 to 250 mg KOH/g, and/or the hydroxyl-group containing polyurethane (meth)acrylates with a hydroxyl number in the range from 20 to 300 mg KOH/g, preferably from 40 to 150 mg KOH/g, more preferably from 50 to 140 mg KOH/g. Such compounds are described e.g. on pages 37 to 56 of P. K. T. Oldring (Ed.), Chemistry &Technology of UV and EB Formulations For Coatings, Inks &Paints, Vol. 2, 1991, SITA Technology, London.

Hydroxyl-group-containing epoxy (meth)acrylates are typically reaction products of acrylic acid and/or methacrylic acid with epoxides (glycidyl compounds) of monomeric, oligomeric or polymeric bisphenol A, bisphenol F, hexanediol and/or butanediol, or their ethoxylated and/or propoxylated derivatives. Hydroxyl-group-containing epoxy (meth)acrylates also include the addition products of acrylic acid and/or methacrylic acid with epoxides of unsaturated fats (fatty acid triglycerides), for example EBECRYL® 860. Examples of suitable epoxy (meth)acrylate include EBECRYL® 3600, EBECRYL® 3700, EBECRYL® 3701 etc.

Typically such compounds (i-1.a) have a residual average hydroxyl functionality higher than 1. This leads to extended products and that is not always desired. Other suitable compounds, compounds (i-1.b), with a residual average hydroxyl functionality of about 1 are listed below.

These are e.g. the esterification products of aliphatic and/or aromatic polyols with (meth)acrylic acid having a residual average hydroxyl functionality of about 1. The partial esterification products of (meth)acrylic acid with tri-, tetra-, penta- or hexahydric polyols or mixtures thereof are preferred. In this context, it is also possible to use reaction products of such polyols with ethylene oxide and/or propylene oxide or mixtures thereof, or reaction products of such polyols with lactones, which add to these polyols in a ring-opening reaction. Examples of suitable lactones are γ-butyrolactone and, in particular δ-valerolactone and ε-caprolactone. These modified or unmodified polyols are partly esterified with acrylic acid, methacrylic acid or mixtures thereof until the desired residual hydroxyl functionality is reached.

Also suitable are the reaction products of (meth)acrylic acid with aliphatic, cycloaliphatic or aromatic compounds bearing an epoxy functionality together with at least one (meth)acrylic functionality can be used as well.

Equally suited are the (meth)acrylic esters with linear and branched polyols in which on average one hydroxy functionality remains free, like hydroxyalkyl(meth)acrylates having 1 to 20 carbon atoms in the alkyl group. Particularly preferred are compounds comprising at least two (meth) acryl functions such as glycerol di(meth)acrylate, trimethylolpropane di(meth)acrylate, pentaerythritol tri(meth)acrylate, di-trimethylolpropane tri(meth)acrylate, di-pentaerythritol penta(meth)acrylate and their (poly) ethoxylated and/or (poly)propoxylated equivalents such as glycerol(OP)$_3$ di(meth)acrylate, EP/PO pentaerythritol tri (meth)acrylate, trimethylolpropane(OE)$_4$ di(meth)acrylate. These compounds are often provided in the form of mixtures, for instance the pentaerythritol triacrylate mixture primarily contains the tri-acrylate but also a substantial part of the tetra- and the di-acrylate. The same for e.g. di-pentaerythritol penta acrylate which contains a mixture of penta- and hexa-acrylates.

Typically compounds (i-1.b) are selected from the group consisting of di-pentaerythritol penta/hexa (meth)acrylate [with typically an IOH of 45-75 & an IAc of 0-8 mg KOH/g], pentaerithrytol tri(meth)acrylate [with typically an IOH of 90-140 & an IAc of 0-10 mg KOH/g], di-trimethylolpropane tri(meth)acrylate [with typically an IOH of 115-155 & an IAc of 0-8 mg KOH/g], propoxylated glycerol di(meth)acrylate [with typically an IOH of 150-180 & an IAc of 0-5 mg KOH/g], propoxylated trimethylolpropane tri(meth)acrylate [with typically an IOH of 120-155 & an IAc of 0-4 mg KOH/g] and/or oxyethylated/oxypropylated pentaerithrytol tri(meth)acrylate [with typically an IOH of 75-110 & an IAc of 0-8 mg KOH/g]. Mostly acrylates are used. Particularly preferred are pentaerythritol triacrylate, oxyethylated/oxypropylated pentaerithrytol triacrylate and/ or di-pentaerythritol pentaacrylate (DPHA).

Optionally compounds (i-1) may be used in combination with compounds (i-2). The following are suitable compounds (i-2): monomeric compounds bearing one hydroxyl function and one (meth) acrylate group. Examples of suitable monohydroxy-functional, (meth)acrylate-group-containing alcohols are e.g. 2-hydroxyethyl (meth)acrylate, caprolactone-extended modifications of 2-hydroxyethyl (meth)acrylate, such as Pemcure 12A (Cognis, DE), 2-hydroxypropyl (meth)acrylate, 4-hydroxybutyl (meth)acrylate, 3-hydroxy-2,2-dimethylpropyl (meth)acrylate etc. In this group also the reaction products of (meth)acrylic acid with glycidyl (meth)acrylate or the glycidyl ester of tertiary, saturated monocarboxylic acid. Tertiary, saturated monocarboxylic acids are, for example, 2,2-dimethylbutyric acid, ethylmethylbutyric acid, ethylmethylpentanoic acid, ethylmethylhexanoic acid, ethylmethylheptanoic acid and/or ethylmethyloctanoic acid.

Generally preferred compounds (i-1) are those represented by Formula 1—wherein R' can be alkyl, (poly)ester, (poly)ether (poly)carbonate, (poly)urethane or (poly)amide. Herein the alkyl most typically has from 1 to 60, more preferably from 1 to 20 carbon atoms in the alkyl group. For the optional compounds (i-2), the same, but then n=1.

Preferably, the orthoester (ii) has the formula $M(OR)_x$ in which M is titanium or zirconium and R is an alkyl group. 'x' is typically 4 (see Formula 2 below). The orthoester can be a condensed orthoester, forming an oligomer or polymer like structure.

The compound (ii) may be a titanium orthoester (ii-a) and/or a zirconium orthoester (ii-b). In an embodiment of the invention the compound (ii) is an orthotitanate. In another embodiment the compound (ii) is an orthozirconate. In yet another embodiment of the invention a mixture of orthotitanates and orthozirconates is used. Orthotitanates and orthozirconates are typically preferred because of their good compatibility with acrylated resins.

Preferred are tetraalkyl titanates and/or tetraalkyl zirconates of the general formula $M(OR)_4$ wherein R is an alkyl group, preferably one having from 1 to 20 carbon atoms. The alkyl group has typically a formula —$C_nH_{2n+1}$. Typically the alkyl is a C1-C12 alkyl, preferably a C1-C10 alkyl and more preferably a C1-C8 alkyl. Each R group may be the same or be different. Typically the tetraalkyl titanate and/or the tetraalkyl zirconate used to prepare the adhesion promoter (AP) of the invention does not contain any ethylenically unsaturated groups, more in particular does not comprise any (meth)acryloyl groups.

Particularly suitable titanium alkoxides (also named alkyltitanates) include tetra n-butyl titanate, tetra isopropyl titanate, tetra 2-ethylhexyl titanate, tetra n-propyl titanate, tetra ethyl titanate, tetra t-butyl titanate, titanium chelates like dialkyl bis(acetylacetonate)titanate, diisopropyl bis(acetylacetonate)titanate, diisobutylbis(acetylacetonate)titanate and/or dialkyl-bisethylacetoacetatotitanate like diisobutyl-bisethylacetoacetatotitanate or diisopropyl-bisethylacetoacetatotitanate. Most preferred titanates are tetraisopropylorthotitanate and/or tetra ethyl titanate.

Yet is it possible also to use a condensed titanium alkoxide (also named condensed alkyltitanates), and more in particular one of the general formula $R^6O[Ti(OR^6)_2O]_nR^6$ in which $R^6$ represents an alkyl group. Preferably, n is less than 20 and more preferably is less than 10. Preferably $R^6$ contains 1 to 6 carbon atoms and useful condensed alkoxides include the compounds known as polybutyl titanate and polyisopropyl titanate.

Particularly suitable zirconium alkoxides (also named alkylzirconates) include tetra n-propyl zirconate, tetra n-butyl zirconate diisopropyl-bisethylacetoacetatozirconate, tetraethyl zirconate, tetra-isopropylzirconate, tetra n-propyl zirconate, titanium tetra-2-ethylhexyl and chelates like diisopropyldi(ethoxyacetoacetyl)zirconate, di-n-butoxy(bis-2,4-pentanedionate)zirconate. Preferred are tetraethyl zirconate, tetraisopropyl zirconate, tetra n-propyl zirconate, tetrabutyl zirconate and/or tetra 2-ethylhexyl zirconate. Most preferred in this category are tetra ethyl zirconate, tetra n-propyl zirconate, tetra isopropyl zirconate and/or tetrabutyl zirconate.

Yet is it possible also to use a condensed zirconium alkoxide (also named condensed alkylzirconates), and more in particular one of the general formula $R^6O[Zr(OR^6)_2O]_nR^6$ in which $R^6$ represents an alkyl group. Preferably, n is less than 20 and more preferably is less than 10. Preferably $R^6$ contains 1 to 6 carbon atoms and useful condensed alkoxides include the compounds known as polybutyl zirconate, polyisopropyl zirconate and/or poly-n-propyl zirconate.

In an embodiment of the invention, compounds (ii) are selected from titanates (any of the above). In another embodiment of the invention, compounds (ii) are selected from zirconates (any of the above). Possibly a mixture of both is used. Preferred in the context of the invention are zirconates.

Typically the amount of zirconates, relative to the total weight of compounds (ii), is at least 60 wt %. Preferably this amount is at least 70 wt %, more preferably at least 80 wt % and most preferably at least 90 wt %. In some embodiments, it may be preferred to use only zirconates (any of the ones mentioned above).

Below some preferred compounds (AP) are described as well as the way to obtain these.

Preferred are e.g. compounds (AP) that are obtained from the reaction of at least one compound (i) as described by Formula 1 with at least one compound (ii) as described by Formula 2:

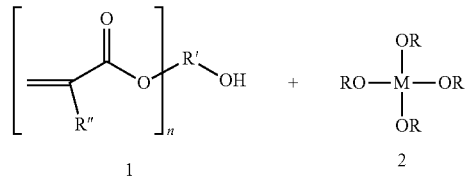

In a preferred embodiment of the invention hereby compounds (AP) are obtained that are represented by the following Formula (I):

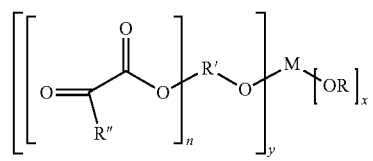

In the above, typically:
n>=2
y=an integer from 1 to 4
x=4-y
M=Ti or Zr
R=alkyl
R'=alkyl, (poly)ester, (poly)ether (poly)carbonate, (poly)urethane or (poly)amide
R''=—H or —$CH_3$.

In the above, at least 1, generally at least 1.5, more typically at least 2, preferably at least 2.5, more preferably at least 3, even more preferably at least 3.5 and most typically at least 4 equivalents of compounds (i) are used for one mole of orthoester (ii) that is reacted.

Preferably the sum of the weight percentages of compounds (i) and (ii) is >70 wt %, typically >90 wt %, most typically >95 wt %. Herein weight percentages are relative to the total weight of the compound (AP). In an embodiment, the sum equals 100 wt %—meaning that no other building blocks than compounds (i) and (ii) are used.

The above-described reaction can proceed with or without solvent. Alternatively reactive diluents, typically acrylated diluting monomers can be used to control the viscosity.

Compounds (AP) as described above are typically produced by using at least 3 equivalents of compounds (i) compared to 1 mol of compounds (ii). The reaction is typically completed by stripping off the alcohol (R'OH, e.g. isopropanol) that is formed under vacuum. Unreacted compounds (i) can remain in the end product after stripping of the alcohol. No catalyst is required.

In yet another embodiment of the invention, at least one compound (iii)—different from compounds (i)—is added to the composition containing compounds (i) and (ii). This optional compound (iii) is reacted with compounds (ii). The functional group capable to react with hydroxyl functions typically is a carboxylic acid group. Compounds (iii) typically are selected from (meth)acryloyl functionalized carboxylic acids.

In this embodiment of the invention, compounds (AP) are obtained by reacting at least one compound (i) as described by Formula 1, with at least one compound (iii) as described by Formula 3 and at least one compound (ii) as e.g. described by Formula 2.

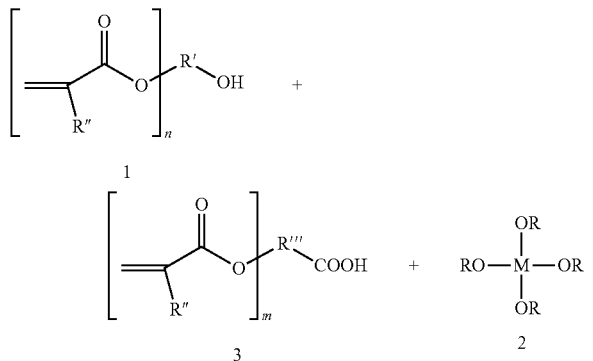

In the above typically:
m≥1
R'''=alkyl, (poly)ester, (poly)ether (poly)carbonate, (poly)urethane or (poly)amide
R, R', R", n and M are as described before.

The (meth)acrylated functionalized carboxylic acid of Formula 3 can be obtained by the reaction of a (meth)acrylated polyol with an organic anhydride as described in US 2003/0161976. Suitable anhydrides include, but are not limited to: phthalic anhydride, maleic anhydride, trimellitic anhydride, tetrahydrophthalic anhydride, hexahydrophthalic anhydride, tetrachlorophthalic anhydride, adipic anhydride, azelaic anhydride, sebacic anhydride, succinic anhydride, glutaric anhydride, malonic anhydride, pimelic anhydride, suberic anhydride, 2,2-dimethylsuccinic anhydride, 3,3-dimethylglutaric anhydride, 2,2-dimethylglutaric anhydride, dodecenylsuccinic anhydride, nadic methyl anhydride, octenyl succinic anhydride, HET anhydride and the like. Carboxylic acids can also be used: like for instance (meth)acrylic acid, an acrylic acid dimer (e.g. beta CEA, 2-carboxyethylacrylate) or its oligomers, and/or polyester (meth)acrylates with residual carboxylic acid groups.

Typically such compounds are obtained by reacting at least 1 equivalent OH of compounds of Formula 1 and at least 1 equivalent COOH of compounds of Formula 3 with 1 mole of compounds of Formula 2.

Even more preferably compounds (AP) are prepared by reacting at least 1 (preferably at least 2) equivalents OH of compounds of Formula 1 and at least 1 (preferably at least 2) equivalents COOH of compounds of Formula 3 with 1 mole of compounds of Formula 2.

In the above, the sum of the weight percentages of compounds (i), (ii) and (iii) is typically >70 wt %, more typically >90 wt %, most typically >95 wt %. Herein weight percentages are relative to the total weight of the compound (AP). In an embodiment, the sum equals 100 wt %—meaning that no other building blocks than compounds (i), (ii) and (iii) are used.

Once again, the above-described reaction can proceed with or without solvent. Alternatively reactive diluents, typically acrylated diluting monomers can be used to control the viscosity.

If present, compound (iii) is typically forming a minor weight percentage, such as less than 50% of the sum of compounds (i), (ii) and (iii). Preferably, optional compound (iii) is present in an amount of less than 50% of the sum of compounds (i) and (iii). Preferably, the adhesion promoter is obtained using only compounds (i) and (ii), without adding compound (iii). This embodiment permits to avoid an additional step of reacting hydroxyl group containing compound with anhydride compound. It also permits to decrease the probability of unwanted later side effects due to the very high amount of remaining carboxyl groups in the adhesion promoter when using compound (iii), as each mole of compound (iii) produces typically one mole of carboxylic acid group in the formed adhesion promoter.

It may be noted that some reaction with carboxyl groups can happen in situ without harm for example when the adhesion promoter is incorporated in a composition containing some amounts of free acrylic acid, acrylic acid dimer such as beta CEA or acid-functional polyester acrylate.

An example of compounds (AP) that may be obtained as such are e.g. compounds according to Formula (II):

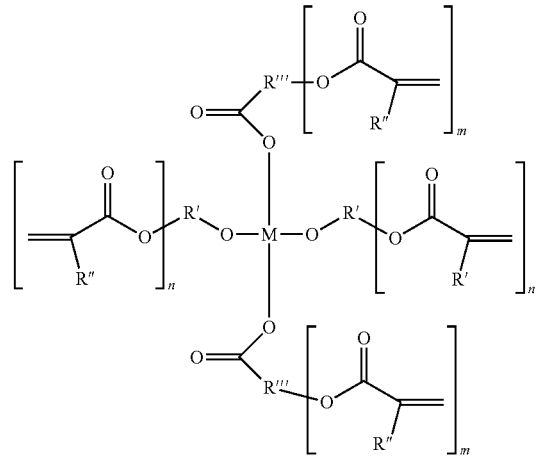

with n, m, M, R, R', R" and R''' are as defined above.

If n≥2 and/or m≥2 (in any of the above), then two or more (meth)acryloyl groups (typically acrylate groups) are introduced per ligand. This confers high UV reactivity. Another advantage is that the chance of an incomplete curing is hereby reduced and thereby also the risk of migration. Migration of unreacted species is undesired in some end applications like the food packaging industry.

Preferably the molar ratio of OH/M 3, more preferably ≥4, where the OH content is the amount (in equivalents) of OH derived from compounds (i) of Formula 1. This has a positive effect on product stability.

When titanates are used to prepare compounds (AP), then the Ti content of this compound is typically between 0.1 and 10 wt % more preferably between 1 and 5 wt % and most preferably between 1.5 and 3 wt %. Weight percentages are herein relative to the total weight of the adhesion promoter (AP).

When zirconates are used to prepare compounds (AP), then the Zr content of this compound is typically between 0.2 and 20 wt % more preferably between 2 and 10 wt % and most preferably between 3 and 6 wt %. Weight percentages are herein relative to the total weight of the adhesion promoter (AP).

Viscosities of compounds (AP) according to the invention typically are between 10 and 100,000, preferably between 10 and 50,000, more preferably 50 and 10,000 and most preferably between 100 and 5,000 mPa·s at 25° C.

Compounds (AP) of the invention confer good adhesion of pigmented coatings, inks and transparent coatings on non-porous substrates like plastics, more in particular apolar plastics. Typically the non-porous substrate (e.g. PP) is surface treated. Examples of suitable surface treatments include exposing a surface of the plastic and more in particular the polyolefin to a corona discharge, ultraviolet radiation, heat, flame, or an electron beam, typically in the presence of air to oxidize the surface of the polyolefin. Preferred are corona treatment and/or a flame treatment. Best results were obtained on surface treated plastics like e.g. corona treated OPP.

Differences between materials of the invention and other materials were most pronounced if the coating or the ink was based on titanium dioxide (e.g. a white pigmented ink) though of course other pigments can be used as well (see e.g. the list further below). Compounds (AP) of the invention further proved compatible with standard UV materials. They may hence be used in a radiation curable composition (RCC) of the invention.

Provided herein is hence also a radiation curable composition (RCC) that comprises at least one compound (AP) according to the invention and further at least one ethylenically unsaturated compound (UC) that is different from compounds (AP). Compounds (UC) typically are (meth)acrylated compounds and most typically they are acrylated compounds. They may be monomers, oligomers or polymers.

Typically compositions (RCC) of the invention comprise, relative to the total weight of the composition, at least 1% by weight (wt %) of adhesion promoters (AP) according to the invention. Preferably this amount is at least 10 wt %, more preferably at least 20 wt %. Typically this amount is at most 99 wt %, more typically at most 80 wt % and most typically at most 50 wt %.

If the composition (which may be a coating composition or an ink) contains $TiO_2$, then the amount of adhesion promoters (AP) in the composition typically is at least 5 wt % and more preferably at least 20 wt %. Typically the content of (Ti+Zr) in the composition, coming from the adhesion promoter (AP) is at least 0.1 wt %, preferably at least 0.5 wt %. When the adhesion promoter (AP) is used in a masterbatch, then the amount of compounds (AP) in the composition is typically from 10 to 99 wt %, more typically from 20 to 80 wt %, most typically from 30 to 70 wt %.

Radiation curable compositions (RCC) of the invention often contain at least other ethylenically unsaturated compounds (UC) that are different from compounds (AP). Most typically compounds (UC) are (meth)acrylated compounds. Radiation curable compositions (RCC) of the invention e.g. typically contain some reactive diluents (UC-1). Reactive diluents may be chosen from (meth)acrylated polyols like 1,2-ethylene glycol diacrylate, 1,4-butandiol diacrylate, 1,6-hexandiol diacrylate, dipropylene glycol diacrylate, isosorbide diacrylate, neopentylglycol diacrylate, ethoxylated neopentylglycol diacrylates, propoxylated neopentylglycol diacrylates, tripropylene glycol diacrylate, bisphenol-A diacrylate, ethoxylated bisphenol-A-diacrylates, bisphenol-A-diglycidylether diacrylate, ethoxylated bisphenol-A-diacrylates, poly(ethylene)glycol diacrylates, trimethylolpropane triacrylate, trimethylolpropane trimethacrylate, ethoxylated trimethylolpropane triacrylates, propoxylated trimethylolpropane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate ethoxylated dipentaerythritol hexaacrylates or mixtures thereof, and are preferably ethoxylated trimethylolpropane triacrylates, ethoxylated pentaerythritol triacrylates and propoxylated pentaerythritol tetraacrylates.

In particular, when the coating composition or ink is formulated for food packaging, then multifunctional (meth) acrylates such as ethoxylated pentaerythritol tetraacrylate, ditrimethylolpropane tetraacrylate, dipentaerythritol pentaacrylate, dipentaerythritol hexaacrylate, ethoxylated dipentaerythritol hexaacrylate, or mixtures of any of these are preferred.

Typically the amount of reactive diluents (UC-1) in compositions (RCC) of the invention is from 0 to 90 wt %, preferably from 10 to 80 wt % and most preferably from 20 to 60 wt %, relative to the total weight of the composition.

Compositions (RCC) of the invention may further contain other (meth)acrylated compounds (UC-2) such as polyester (meth)acrylates, polyether (meth)acrylates, urethane (meth) acrylates, epoxy (meth)acrylates and/or (meth)acrylated (meth)acrylics. Such compounds are well known in the art and have been described widely.

Typically the amount of compounds (UC-2) in compositions (RCC) of the invention is from 0 to 90 wt %, preferably from 10 to 80 wt % and most preferably from 20 to 60 wt %.

Typically the composition (RCC) of the invention is a 100% UV composition. Most typically it does not contain substantial amounts of water. The composition of the invention is hence also referred to as a non-aqueous composition. Organic solvents (solvents other than water) may be present but, if present at all, then their amount most typically is limited to at most 50 wt %, more preferably at most 10 wt %.

The adhesion promoters (AP) of the invention may be useful in various radiation curable coating compositions, e.g. for use on metal, non-porous substrates like plastics etc., but they are particularly useful in radiation curable flexographic screen, inkjet and gravure inks.

The coating may be a pigmented or a clear coating. It may be a glossy or a matte coating. The coating can be used as a primer, as a base coat or as a sealer.

Inks according to the invention usually contain one or more pigments and/or one or more dyes. Typical pigments which can be used are the colored inorganic pigments, white inorganic pigments and colored organic pigments. Organic dyes can be used to give the ink an appropriate color and often they are used in conjunction with an opacifying white inorganic pigment such as titanium dioxide.

Varnishes may be prepared for application in a non-pigmented state to a substrate, or they may be prepared for the later preparation of a colored ink or coating by the addition of a pigment or dye, which may itself be dispersed as a concentrate or master batch in a quantity of a similar ink composition.

Radiation curable compositions (RCC) of the invention may further contain at least one photo-initiator. The photoinitiator is useful for an ultraviolet (UV) radiation-cure. In other embodiments, for example, when using an electron beam cure or a free radical system, the photoinitiator can be omitted. Possibly radiation curable compositions (RCC) of the invention are cured using low energy sources such as UV LED or HUV.

Radiation curable compositions (RCC) of the invention can also include additives such as inhibitors, anti-oxidants, UV stabilizers, UV absorbers, dispersing agents, slip aids, fillers, plasticizing agents, flow additives, anti-foaming additives, water scavengers, matting agents, waxes, pigments, dyes and/or resinous materials dispersed or solubilized in the composition. The selection and use of such additives is within the skill of the art.

Examples of photo-initiators that may be used include, but are not limited to, the following: hydroxycyclohexylphenyl ketone, hydroxymethylphenylpropanone, dimethoxyphenylacetophenone, 2-methyl-1-[4-(methyl thio)-phenyl]-2-morpholinopropanone-1, 1-(4-isopropylphenyl)-2-hydroxy-2-methylpropan-1-one; 1-(4-dodecyl-phenyl)-2-hydroxy-2-methylpropan-1-one, 4-(2-hydroxyethoxy)phenyl-2(2-hydroxy-2-propyl)-ketone; diethoxyphenyl acetophenone, 2,4,6 trimethylbenzoyl diphenylphosphone, a mixture of (2,6-dimethoxy benzoyl)-2,4,4 trimethylpentylphosphineoxide and 2-hydroxy-2-methyl-1-phenyl-propan-1-one, and mixtures of these. Some companies have polymeric photo-initiators on the market that can be used in the food packaging industry. Photo-initiators are typically used in an amount from 0.1 to 10% by weight.

Examples of water scavengers that may advantageously be used are isocyanates like p-toluenesulfonyl isocyanate, acetals like dimethoxymethane, 1, 1-dinnethoxyethane, 1, 1-diethoxyethane, 1, 1,3,3-tetraethoxypropane, ketals like 2,2-d imethoxypropane, 2, 2-d iethoxypropane, orthoesters like tetramethyl orthocarbonate, trimelhyl orthoformate, trimelhyl orthoacetate, triethyl orthoformate, triethyl orthoacetatetriethyl orthopropionate, silanes like triethoxyvinylsilane trinnethoxyvinylsilane, methyl trimelhoxy silane, dimethyl dimelhoxy silane, titanates like tetraisopropyl titanate and tetraethyl titanate, zirconates like tetraethylzirconate, tetra n-propyl zirconate, tetra n-butyl zirconate, organo-aluminates like aluminum isopropoxide and aluminum ethoxide. Preferred in the invention are p-toluenesulfonyl isocyanate, triethoxyvinylsilane, tetrapropylorthozirconate and/or tetraethylorthotitanate. Particularly preferred is p-toluenesulfonyl isocyanate. Water scavengers are typically used in an amount from 0 to 20 wt %, preferably from 0.5 to 10 wt % and most preferably from 1 to 5 wt %, relative to the total weight of the composition. Desiccants like barium oxide, calcium chloride, calcium oxide calcium sulfate and clays, phosphorus pentoxide, activated alumina, molecular sieves, silica gels and dried titanium dioxide can also be used but are less preferred.

Examples of inhibitors and anti-oxidants that may be used in the context of the invention include but are not limited to: triphenylphosphite (TPP), tris(nonylphenyl)phosphite, tris (2,4-di-t-butylphenyl)phosphite, phenothiazine (PTZ), butylhydroxytolueen (BHT), monomethyl ether hydroquinone (MeHQ), hydroquinone, propylgallate, 4-tert-Butylcatechol, butylated hydroxyl anisole or Irganox MD 1024 (phenolic antioxidant, from BASF). Steric hindered phenols (like BHT) are herein preferred over non-steric hindered phenols. Typically these inhibitors and anti-oxidants are used at a concentration of about 1000 ppm.

Examples of suitables UV stabilizers and UV absorbers are hindered phenols, phosphites and thioethers, hindered amine light stabilizers (HALS), benzotriazoles etc. Preferred are hindered phenols, hindered amine light stabilizers (HALS) and/or benzotriazoles. Examples of additives that may help to reduce the yellowing upon cure (the photo-yellowing) include but are not limited to e.g. the hydrazines and hydrazides as described in WO 2003/060017. A suitable example hereof is e.g. HN130 from Japan Hydrazide A suitable anti-oxidant is e.g. Irganox MD 1024 from BASF.

The pigment that can be used in compositions of the invention is any pigment used in paste or liquid inks. A list of such pigments can be found in the Color Index. More particularly, those pigments may be cited such as Process Yellow 13 (Diarylide Yellow—Irgalite BAW of Ciba, Permanent GR of Clariant), Process Magenta Pigment 57 (Bona Calcium—Ilobona 4BY of Sun, Irgalite SMA of Ciba), Process Blue 15.3 (Copper Phthalocyanine—Irgalite GLO of Ciba, Hostaperm Blue B2G of Clariant), Process Black 7 (Oxidised Carbon Black—Special Black 250; Special Black 350 of Degussa), etc. The pigments are preferably used at 1-50% by weight of the total weight of the composition, more preferably at 1-40% by weight.

The adhesion promoters of the invention may be used together with other zirconates and/or titanates like e.g. described in U.S. Pat. No. 5,859,087 By 'other' is meant adhesion promoters different from compounds (AP). Specific examples of suitable zirconate compounds include: zirconate tetra-n-butoxide, zirconate tetra-t-butoxide; zirconate di-n-butoxide (bis-2,4-pentanedionate), zirconate dimethacrylate dibutoxide, zirconate tetraethoxide, zirconate tetraisoproxide, zirconate tetra-n-proxide, zirconate tetra-2-ethylhexoxide and/or zirconate 2,4-pentanedionate. Specific examples of suitable titanate compounds include: titanate bis(triethanolamine)-diisoperoxide, titanate tetra-n-butoxide, titanate di-n-butoxide (bis-2,4-pentanedionate), titanate diisoperoxide (bis-2,4-pentanedionate), titanate tetraethoxide, titanate tetraisopropoxide, titanate tetraisobutoxide, titanate methacrylate triisopropoxide, and/or titanate tetra-n-propoxide. Preferably however, at least 60 wt % of adhesion promoters (AP) of the invention are used, relative to the total of adhesion promoters in the composition. Often this amount is at least 70 wt % an in an embodiment of the invention this amount is at least 90 wt %, near 100 wt %.

Adhesion promoters (AP) and radiation curable compositions (RCC) of the invention can be used for the making of coating compositions, inks, varnishes (incl. overprint varnishes), paints and adhesives (incl. UV laminating adhesives). Another aspect of the invention relates to coating compositions, inks, varnishes (incl. overprint varnishes), paints and adhesives (incl. UV laminating adhesives) that are prepared from adhesion promoters (AP) and/or from compositions (RCC) of the invention. The composition (RCC) of the invention can be clear or pigmented, but typically is pigmented. In embodiment of the invention, titanium dioxide ($TiO_2$) is present in the radiation curable composition (RCC) of the invention. Materials of the invention are further suited for the making of UV laminating adhesives, composites, 3D objects for 3D-printing etc. In an embodiment of the invention the radiation curable composition is a coating composition, more in particular a pigmented coating composition and most in particular a coating composition that is based on titanium oxide. In another and preferred embodiment the radiation curable composition is an ink or a varnish, more in particular an ink including an ink that is based on titanium dioxide.

Inks of the present invention can be offset inks, flexo inks, gravure inks, screen inks, digital inks and inkjet inks.

Inks of the present invention are in particular suited for use on substrates formed of plastics materials (especially films), such as those used in packaging (especially food packaging). Examples of such substrates include polyester, polyethylene, polypropylene or co-extruded polypropylene/polyethylene film or sheets and polyvinylidene dichloride coated plastics material but this list is not intended to be limiting.

Packaging materials of the invention may contain a pharmaceutical, a cosmetic product, a food or a beverage grade product.

Yet another aspect of the invention concerns a packaging material suitable for containing a pharmaceutical product, a cosmetic product, a beverage or food grade product comprising:
  at least one layer formulated from a radiation curable composition (RCC) according to the invention.

Optionally a further layer, other than the above can be applied.

Materials of the invention are in particular suited for use in indirect food contact, wherein the term 'food' as used herein also applies to beverages including alcoholic beverages. The packaging material may be a flexible packaging that can be made from a wide range of different types of materials including various types of plastic films, paper, and aluminum foil. The plastic films include various types of polyolefins, polyesters, and polyamides. The following may also be used: PET, polycarbonate and PE. The films may be various combinations of homopolymers, copolymers, and polymer blends. The films may be a single layer or may be coextruded in multiple layers. The films are also commonly coated, metalized, or otherwise treated to enhance the performance of the resulting package.

Preferred methods of applying the radiation curable compositions (RCC) of the invention include the use of well-known web coating methods such as roll coating, gravure, offset gravure, etc. Other techniques of applying a coating composition according to the invention include but are not limited to spray, dip coating, etc.

Compositions (RCC) of the invention may be applied on various substrates such as metal, foils, wood, stone, paper, MDF, concrete, plastic, glass, textile etc. They are particular suited for use on non-porous substrates like plastics and more in particular apolar plastics. Materials of the invention are in particular suited for use on polyolefin materials.

These are known to be less effective barriers to migration of low molecular weight organic compounds, plus they are known to be difficult substrates qua adhesion. Polyolefins that are common in the art are the homopolymers or copolymers of ethylene, butylene, propylene, hexene, octene, etc. Preferred polyolefin based films include polypropylene and polyethylene, such as high-density polyethylene (HDPE) or linear-low-density polyethylene (LLDPE), polyisobutylene (PIB). Oriented forms of polypropylene can be used as desired, such as biaxially oriented (BOPP) or oriented polypropylene (OPP). PET, PE and polycarbonate (PC) are also possible substrates.

If desired, the polyolefin may be coated, blended, copolymerized or coextruded with other materials to enhance the barrier, handling, appearance or sealing properties. These modifications are included in the definitions of a "polyolefin based material" and "a material comprising polyolefin".

Common coatings used on polyolefins include polyvinylidene chloride (PVdC), acrylic based coatings, and various other barrier and heat-seal coatings. The polyolefin may also receive a thin layer of metal using a vacuum metalization process. Common polyolefin copolymers used to produce films for flexible packaging include copolymers of ethylene and vinlyacetate (EVA), and ethylene and vinyl alcohol (EVOH), ethylene and acrylic acid, ethylene and ethyl acrylate. In spite of the fact that many of these modifications are known to improve the barrier properties of polyolefins, a migrating resistant laminating adhesive is still desirable to prevent off-flavor and odor in the packaged product (the packaging material made for instance of PET or polycarbonate).

A particular embodiment of the invention relates to a packaging material having a white polyolefin layer having printed material on an outside surface thereof that is formulated from an adhesion promoter (AP) and/or a radiation curable composition (RCC) of the invention. The printing can be performed using any conventional method, such as well-known ink and/or electrophotographic techniques. Preferred methods include the use of a flexographic or gravure printing press to apply print in a continuous line.

The invention also relates to the use of radiation curable compositions (RCC) of the invention on low surface energy layers, and in particular on polyolefins that typically are apolar substrates. Typically the materials of the invention are incorporated into an ink like flexo inks. The adhesion on apolar plastics is a challenge in the art but is significantly improved when materials of the invention are used. When using the materials of the invention on low surface energy layers, such as polyolefins, then preferably the surface of this low energy layer has been surface-treated to enhance adhesion. Surface treating is well known and any conventional surface treating method can be used as desired for the particular application. Examples of suitable surface treating methods include corona treatments, chemical treatments, plasma treatments, flame treatments, heat treatments, exposure to ultraviolet radiation or to an electron beam. Often the surface treatment is performed in the presence of air to oxidize the surface of the polyolefin. Preferably, when a polyolefin based layer is utilized a corona treatment or flame treatment is first applied to the surface prior to applying a composition (RCC) of the invention.

Another aspect of the invention relates to a process for coating an object or a substrate, comprising the steps of:
  (a) providing a radiation curable composition (RCC) according to the invention,
  (b) applying said composition onto a surface of the object or the substrate, and
  (c) irradiating the surface with actinic radiation, most typically UV.

In an embodiment of the invention the object or the substrate to coat is made of a non-porous material like plastic, more in particular an apolar plastic such as a polyolefin. Typically the surface of the object of the substrate in this case is treated and most preferably corona treated. Other suitable ways of surface treatment have been listed above.

Yet another aspect of the invention relates to a substrate or object that is coated or treated (e.g. in the case of wood that may be impregnated instead of coated) with a radiation curable composition (RCC) according to the invention. The substrate may be a polyolefin film and the object may be a polyolefin molded article or polyolefin film having on at least one surface a printable coating prepared from materials of the invention. The coating (which can be in the form of an ink) can be a primer, sealer or a topcoat.

Materials of the invention have the advantage that they provide low odor, taint and possibly low migration.

The invention will be further explained by the following non-limiting examples.

EXAMPLES

Hydroxyl values (1OH in mg KOH/g) were measured using the following potentiometric titration method. This "OH Number" method covers the automated quantification procedure for hydroxyl groups by means of potentiometric titration. The hydroxyl number is defined as the number of milligrams of potassium hydroxide required to neutralize the hydrolysis product of the fully acetylated derivative prepared out of one gram of resin. Step 1 Acetylation step: All hydroxyl functions are acetylated at 75° C. by acetyl chloride. Step 2 Hydrolysis step: The excess of acetyl chloride is hydrolysed by a solution of N-methyl-2-pyrrolidone (NMP) in water. Step 3 Titration step: The formed acid functions are titrated with KOH 0.5 N solution.

Acid values (IAc in mg KOH/g) were also measured using potentiometric titration. The "total acid number" equals the milligrams of potassium hydroxide (KOH) required to neutralize the acid(s) present in 1 g of sample after hydrolysis of present anhydrides. The anhydrides present in the sample are hydrolysed to the corresponding acids during a hydrolysis step and titrated with a standardized solution of KOH. Different titrant solutions i.e. KOH 0.1N and/or KOH 0.5N can be used when analyzing samples with low respectively high total acid number. Potentiometric titration allows end-point identification automatically by means of a titroprocessor and a pH electrode, the manual titration uses a color indicator (phenolphthalein) for visual end-point identification. The amount of KOH is used to calculate the total acid number.

Viscosity: The viscosity of the adhesion promoters is measured at a fixed shear rate with a cone and plate type rheometer MCR100 (Paar-Physica) according to DIN EN ISO 3219, 25 1/s; 25° C.

Aspect: The aspect was rated visually.

Stability: Product stability was tested at 80° C. in 100 ml bottles filled at 90% with cap. Viscosity increase due to polymerization was checked over time.

Synthesis of Compounds (AP) According to the Invention

A double jacket (oil heated) reactor equipped with an overhead mixer, condenser, thermocouple, and nitrogen inlet is charged with 1 mol of tetraisopropyltitanate (EX 1-3 & Comparative Examples 1, 2 & 4) or 1 mol of tetra n-propylzirconate (EX 4-5 & Comparative Example 3) and different equivalents of oxypropylated/oxyethylated pentaerythritol triacrylate (OH value 98 mg KOH/g; EX 1-5) or TONE M-100 (OH value 161 mg KOH/g, EX 6) or carduraacrylate (OH value 152 mg KOH/g, EX7). The reaction mixture is heated at 60° C. and isopropanol (EX 1-3 & Comparative Examples 1-4) or n-propanol (EX 4-5) is removed by distillation under vacuum and air sparge. When distillation is completed, the reaction mixture is cooled down at room temperature.

OH values expressed in mg KOH/g can be converted in milliequivalents OH/g by dividing the value by 56.1 (molecular weight of KOH).

TABLE 1

Formulation composition and stability

| | EX 1 | EX 2 | EX 3 | EX 4 | EX 5 | COMP1 | COMP2 | COMP3 | COMP4 |
|---|---|---|---|---|---|---|---|---|---|
| Tetra iso-propyltitanate (mol) | 1 | 1 | 1 | | | 1 | 1 | | 1 |
| Tetra n-propylzirconate (mol) | | | | 1 | 1 | | | 1 | |
| EO/PO PETIA (eq OH) | 5.5 | 4 | 3 | 4 | 3 | | | | |
| Tone M 100 (monoacrylate) (eq OH) | | | | | | 4 | | | |
| Carduraacrylate (monoacrylate) (eq OH) | | | | | | | | | 4 |
| HEA (monoacrylate) (eq OH) | | | | | | | 4 | 4 | |
| Ti wt % | 1.7 | 2.1 | 2.6 | | | 3.4 | 9.4 | | 3.2 |
| Zr wt % | | | | 3.8 | 5.1 | | | 15.2 | |
| Viscosity @25° C. - mPa · s | 463 | 791 | 4324 | 1433 | 5740 | 702 | Gel | Gel | 971 |
| Aspect | colored | colored | colored | colorless | colorless | colored | colored | colorless | colored |
| Stability | OK | OK | OK | OK | OK | Not stable on storage @80° C. | Gelification during propanol stripping | Gelification during propanol stripping | OK | eq: equivalents;
COMP: Comparative Example

In general, compounds (i-1) that bear at least 2 (meth) acryloyl groups are preferred. For instance, stability was less for materials based on COMP 1-3 than for those based on EX 1-5 (Table 1).

With the above compositions and comparative compositions the following coating formulations were prepared by mixing acrylates, compounds (AP) of the invention and photo-initiators under moderate share.

Adhesion of White Flexo Inks on Plastic

White flexo inks were prepared from the materials above. Inks were herein prepared in two steps: first a pigment paste is made by mixing (dispersing) TiO2 in an acrylated binder under medium to high shear; in a second step to the pigment paste diluting acrylates, compositions of the present invention and photo-initiator are added. The Table below presents differences in adhesion on plastics. Table 2A presents results for titatanate acrylates (AP). Table 2B presents results for zirconate acrylates (AP). Table 3 provides data related to adhesion on plastic after ageing of the radiation curable composition (a white ink). Table 4 shows adhesion on plastic of clear coats.

TABLE 2A

Adhesion of titanates & speed of curing

| Formulation | A1 | A2 | A3 | A4 | A5 | COMP A1 |
|---|---|---|---|---|---|---|
| Di-trimethylolpropane triacrylate | 25 | 25 | 25 | 25 | | 25 |
| Stabilizer solution | 1 | 1 | 1 | 1 | 1 | 1 |
| White pigment RDIS (dispersing) | 35 | 35 | 35 | 35 | 35 | 35 |
| 2-Phenoxyethyl Acrylate | 19 | | 19 | | | |
| Titanate EX 1 | 10 | 29 | | | | |
| Titanate EX 2 | | | 10 | 29 | 54 | |
| Titanate COMP4 | | | | | | 29 |
| Photoinitiator blend 12/2 | 10 | 10 | 10 | 10 | 10 | 10 |
| TOTAL | 100 | 100 | 100 | 100 | 100 | 100 |
| Ti (wt % in the formulation) | 0.2 | 0.5 | 0.2 | 0.6 | 1.1 | 0.9 |
| Finger touch dry (air) | 60 | 60 | 100 | 60 | 100 | 30 |
| Graphite (air) | 25 | 25 | 40 | 35 | 25 | 10 |
| ADHESION immediately | | | | | | |
| 30 m/min 0-24-72 h | 5-5-5 | 5-5-5 | 5-5-5 | 5-5-5 | 5-5-5 | 3-5-5 |
| 60 m/min 0-24-72 h | 5-5-5 | 5-5-5 | 5-5-5 | 5-5-5 | 5-5-5 | 0-4-5 |
| 100 m/min 0-24-72 h | 5-5-5 | 5-5-5 | 5-5-5 | 5-5-5 | 5-5-5 | 0-1-5 |

Photoinitiator blend 12/2 is a mixture of benzophenone (14%), Irgacure 651 (34%), Irgacure 369 (7%), 2-isopropylthioxanthone (13%) and ethyl-4-(dimethylamino)benzoate (32%)

Stabilizer solution: 4% NPAL in TMPEOTA

The ink is applied with a K Printing Proofer on corona treated polypropylene (C58 from Innovia) at a film weight of about 2 g/m².

Films were cured under air and at different speed (30 to 100 m/min) with a 140 W/cm mercury lamp.

Adhesion was measured by tape test using Tesa 4104 tape. The tape is applied on the coating or ink with some pressure to remove air and ensure a close contact between surface and the tape. The tape is pull off with a fast movement. The adhesion is tested just after application, 24 hours and 72 hours after application. Adhesion is expressed from 0 (no adhesion) to 5 (full adhesion).

UV reactivity was assessed by finger touch the "graphite test" (the higher the number, the higher the surface reactivity):

Finger touch: film is assessed as cured (dry) when no tackiness is experienced anymore.

Graphite test: This test is performed by placing some graphite on the coated surface, followed by rubbing said surface with a piece of cotton. If no black stain remain on the surface, the surface is considered cured. E.g. "10 m/min" means that curing at 10 m/min was necessary to pass the graphite test.

Amount of Ti or Zr (wt %, relative to the total weight of the adhesion promoter): measured by X-Ray Fluorescence spectroscopy.

Again we see that adhesion promoters prepared from a mono-acrylate (i-2) performed less good than adhesion promoters (AP) according to the invention with a similar Ti content—COMP A1 versus EX5 (Table 2A).

Table 2B shows that excellent adhesion was obtained using adhesion promoters (AP) according to the invention, even when the Zr content was low.

TABLE 2B

Adhesion of zirconates & speed of curing

| Formulation | B1 | B2 | B3 | B4 |
|---|---|---|---|---|
| Di-trimethylolpropane triacrylate | 25 | 25 | 25 | 25 |
| Stabilizer solution | 1 | 1 | 1 | 1 |
| White pigment RDIS (dispersing) | 35 | 35 | 35 | 35 |
| Di-trimethylolpropane triacrylate | 19 | | 19 | |
| Zirconate EX 4 | 10 | 29 | | |
| Zirconate EX 5 | | | 10 | 29 |
| Photoinitiator blend 12/2 | 10 | 10 | 10 | 10 |
| TOTAL | 100 | 100 | 100 | 100 |
| Zr (wt % in the formulation) | 0.38 | 1.11 | 0.51 | 1.47 |
| APPLICATION on CORONA treated C58 ADHESION | | | | |
| 30 m/min 0-24-72 h | 5-5-5 | 5-5-5 | 5-5-5 | 5-5-5 |
| 60 m/min 0-24-72 h | 5-5-5 | 5-5-5 | 5-5-5 | 5-5-5 |
| 100 m/min 0-24-72 h | 5-5-5 | 5-5-5 | 5-5-5 | 5-5-5 | nt = not tested

Table 3 shows that white inks can be prepared from adhesion promoters (AP) according to the invention that exhibit excellent adhesion on plastics.

TABLE 3

Adhesion on plastic after ageing of the liquid ink formulation-white ink

| Formulation | A4 |
|---|---|
| Di-trimethylolpropane triacrylate | 25 |
| Stab 12/1 (Additol S120) | 1 |
| White pigment RDIS (dispersing) | 35 |
| Di-trimethylolpropane triacrylate | |
| Titanate EX 2 | 29 |
| Photoinitiator blend 12/2 | 10 |
| TOTAL | 100 |
| APPLICATION on CORONA treated C58 ADHESION immediately | |
| 30 m/min | 5-5-5 |
| 60 m/min | 5-5-5 |
| 100 m/min | 5-5-5 |
| ADHESION after 3 weeks | |
| 30 m/min (0/24/72 h) | 0-4-5 |
| 60 m/min (0/24/72 h) | 0-4-4 |
| 100 m/min (0/24/72 h) | 0-2-4 |

Table 4 below demonstrates that also clear coats prepared from adhesion promoters (AP) according to the invention exhibit excellent adhesion on plastics. To mimic ageing, liquid clear coat compositions were kept for 2 weeks at 40° C. Even then adhesion was better compared to other adhesion promoters available on the market (the simple titanates and zirconates).

Adhesion of Clear Coats on Plastic

Titanates from EX 2 (formulation B1) perform less good in adhesion after aging at 40° C. for two weeks of the liquid formulation compared to zirconates from EX 4 (formulations B2 and B3). At lower zirconate concentration (formulation B2) adhesion is still excellent—as good as when used at higher concentration (formulation B3). Zirconates surprisingly perform better after ageing, even at lower concentrations compared to titanates. They show no discoloration either and hence are highly suited for use in both clear coats and pigmented coat (Table 4).

Table 4 further shows that a reaction of compounds (i) and (ii) with compounds (iii) gives good results.

EX 6—Compound B: 1 mol of Tetra n-propyl zirconate (30 wt % n-propanol) was reacted with 2 equivalents oxypropylated/oxyethylated pentaerythritol triacrylate (same as used in Example 1) and 2 mol of 2-carboxyethylacrylate; n-propanol was stripped at 80° C. for 3 hours under vacuum. Product has a viscosity of 2320 mPas @25° C. and a zirconium content of 6.0%. Excellent adhesion is obtained in the clear coat (B4).

Results are presented in Table 4 below:

| Formulation | B1 | B2 | B3 | B4 |
|---|---|---|---|---|
| Di-trimethylolpropane triacrylate | 61 | 80 | 61 | 80 |
| Titanate EX 2 | 29 | | | |
| Zirconate EX 4 | | 10 | 29 | |
| Zirconate EX 6 | | | | 10 |
| Photoinitiator blend 12/2 | 10 | 10 | 10 | 10 |
| TOTAL | 100 | 100 | 100 | 100 |
| Ti (wt % in the formulation) | 0.6 | | | |
| Zr (wt % in the formulation) | | 0.4 | 1.1 | 0.6 |
| APPLICATION on CORONA treated C58 ADHESION immediately | | | | |
| 30 m/min (0-24-72 h) | 5-5-5 | 5-5-5 | 5-5-5 | 5-5-5 |
| 60 m/min (0-24-72 h) | 5-5-5 | 5-5-5 | 5-5-5 | 5-5-5 |
| 100 m/min (0-24-72 h) | 5-5-5 | 5-5-5 | 5-5-5 | 5-5-5 |
| ADHESION after 2 weeks at 40° C. | | | | |
| 30 m/min (0-24-72 h) | 1-4-4 | 5-5-5 | 5-5-5 | n.t. |
| 60 m/min (0-24-72 h) | 0-0-1 | 5-5-5 | 5-5-5 | n.t. |
| 100 m/min (0-24-72 h) | 0-0-3 | 5-5-5 | 5-5-5 | n.t. |

UV Laminating Adhesives

TABLE 5

The product was tested in the following formulations as laminating adhesive for PET/PE.

| | EX1-LA | EX2-LA |
|---|---|---|
| COMPOUND A-EX 4 | 10 | |
| COMPOUND B-EX 6 | | 10 |
| DPHA | 65.5 | 65.5 |
| EBECRYL ® LEO 10501 | 24.5 | 24.5 |
| TPO-L | 2 | 2 |
| Viscosity 25° C. | 2000 | 2010 |

Table 6: excellent adhesion are obtained (immediate & after 1 hour) in PET/PE lamination with the combination DPHA and EB LEO 10501 and Zr-acrylates (from Ex 4 and Ex 6 above).

Polyethyleneterephalate (PET) and polyethylene (PE) films (about 80 microns thickness) were both corona treated. About 5 microns of the coating was applied on the corona treated side of the PET film using an offset Mickle proofer apparatus.

The corona treated side of the polyethylene film was laminated on the coated PET film. The laminate was cured by UV (LED lamp 8 W/cm² air-cooled 365 nm; 1 or 3 times at a belt speed of 5 m/min).

Adhesion test was assessed by tearing both films from each other (180° C. T peel test). This test was done on two samples, immediately after cure and after 1 hour. A score of 5 means that it was not possible to separate both films, without ripping the laminate. This means that excellent adhesion is achieved with the cured composition of the present invention.

TABLE 6

Application results

| | EX 1-LA | | Ex 2-LA | |
|---|---|---|---|---|
| Coat weight | +/−5 g/m² | | +/−5 g/m² | +/−5 g/m² |
| LED lamp (365 nm) | 1 × 5 m/min | 3 × 5 m/min | 1 × 5 m/min | 3 × 5 m/min |
| Adhesion (0 hrs) | 5 | 5 | 5 | 5 |
| Adhesion (1 hour) | 5 | 5 | 5 | 5 |

The invention claimed is:

1. An adhesion promoter (AP) that is the reaction product of:
   (i-1) at least one hydroxyl functional (meth)acrylated compound bearing at least two (meth)acryloyl groups, wherein the at least one compound (i-1) is represented by Formula 1,
   (ii) at least one titanium orthoester (ii-a) and/or at least one zirconium orthoester (ii-b), wherein the at least one compound (ii) is represented by Formula 2, and,
   (iii) optionally, at least one other compound bearing groups capable to react with hydroxyl groups, said groups being carboxylic acid groups,
   wherein Formula 1 is

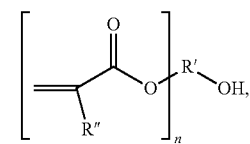

and
wherein Formula 2 is

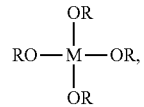

wherein, in Formula 1 and Formula 2,
   $n \geq 2$,
   M=Ti or Zr,
   R=alkyl,
   R'=alkyl, (poly)ester, (poly)ether (poly)carbonate, (poly)urethane or (poly)amide, and
   R"=—H or —CH$_3$.

2. The adhesion promoter of claim 1 that is further prepared from at least one hydroxyl functional (meth)acrylated compound (i-2) bearing one (meth)acryloyl group.

3. The adhesion promoter of claim 1 wherein the compounds (i-1) have a hydroxyl value (IOH) that is from 10 to 300 mg KOH/g.

4. The adhesion promoter of claim 1, obtained from the reaction of at least 3 equivalents of compounds (i) for one mole of orthoester (ii).

5. The adhesion promoter of claim 1, wherein the adhesion promoter is the reaction product of:
(i-1) at least one hydroxyl functional (meth)acrylated compound bearing at least two (meth)acryloyl groups, wherein the at least one compound (i-1) is represented by Formula 1,
(ii) at least one titanium orthoester (ii-a) and/or at least one zirconium orthoester (ii-b), wherein the at least one compound (ii) is represented by Formula 2, and,
(iii) at least one other compound bearing groups capable to react with hydroxyl groups, said groups being carboxylic acid groups, wherein at least one compound (iii) is represented by Formula 3,
wherein Formula 1 is

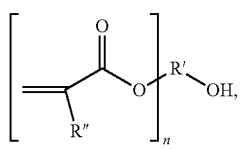

wherein Formula 2 is

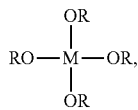

and
wherein Formula 3 is

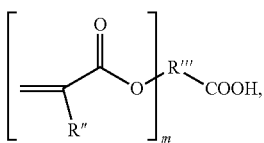

wherein, in Formula 1 and Formula 2,
n>=2,
M=Ti or Zr,
R=alkyl,
R'=alkyl, (poly)ester, (poly)ether (poly)carbonate, (poly)urethane or (poly)amide, and
R''=—H or —CH$_3$, and
wherein, in Formula 3,
m≥1,
R'''=alkyl, (poly)ester, (poly)ether (poly)carbonate, (poly)urethane or (poly)amide, and
R''=—H or —CH$_3$.

6. The adhesion promoter of claim 5, obtained from the reaction of at least 1 equivalent OH of compounds of Formula 1 and at least 1 equivalent COOH of compounds of Formula 3 with 1 mole of compounds of Formula 2.

7. The adhesion promoter of claim 1 wherein the compound (ii) is an orthotitanate.

8. The adhesion promoter of claim 1 wherein the compound (ii) is an orthozirconate.

9. A radiation curable composition comprising at least 1 wt % of one or more adhesion promoters (AP) of claim 1.

10. The radiation curable composition of claim 9, further comprising at least one (meth)acrylated compound (UC) that is different from compounds (AP).

11. A process for coating an object or a substrate, comprising the steps of:
(a) providing a radiation curable composition of claim 10,
(b) applying said composition onto a surface of the object or the substrate, and
(c) irradiating the surface with actinic radiation.

12. A substrate coated with the radiation curable composition of claim 10, wherein the substrate is selected from the group consisting of metal, foils, wood, stone, paper, MDF, concrete, plastic, glass, and textile.

13. A packaging material suitable for containing a pharmaceutical, cosmetic, beverage or food grade product comprising:
at least one layer formulated from the radiation curable composition according to claim 9.

14. A coating, ink, paint, varnish or an adhesive prepared from the adhesion promoter (AP) of claim 1.

15. The adhesion promoter of claim 3 wherein the compounds (i-1) have a hydroxyl value that is from 40 to 250 mg KOH/g.

16. The adhesion promoter of claim 15 wherein the compounds (i-1) have a hydroxyl value that is from 100 to 200 mg KOH/g.

17. The adhesion promoter of claim 8 wherein the compound (ii) is a zirconium alkoxide and/or a condensed zirconium alkoxide.

18. The radiation curable composition of claim 9, which further comprises at least one photo-initiator.

19. A coating, ink, paint, varnish or an adhesive prepared or from the radiation curable composition (RCC) of claim 9.

* * * * *